Feb. 15, 1927.

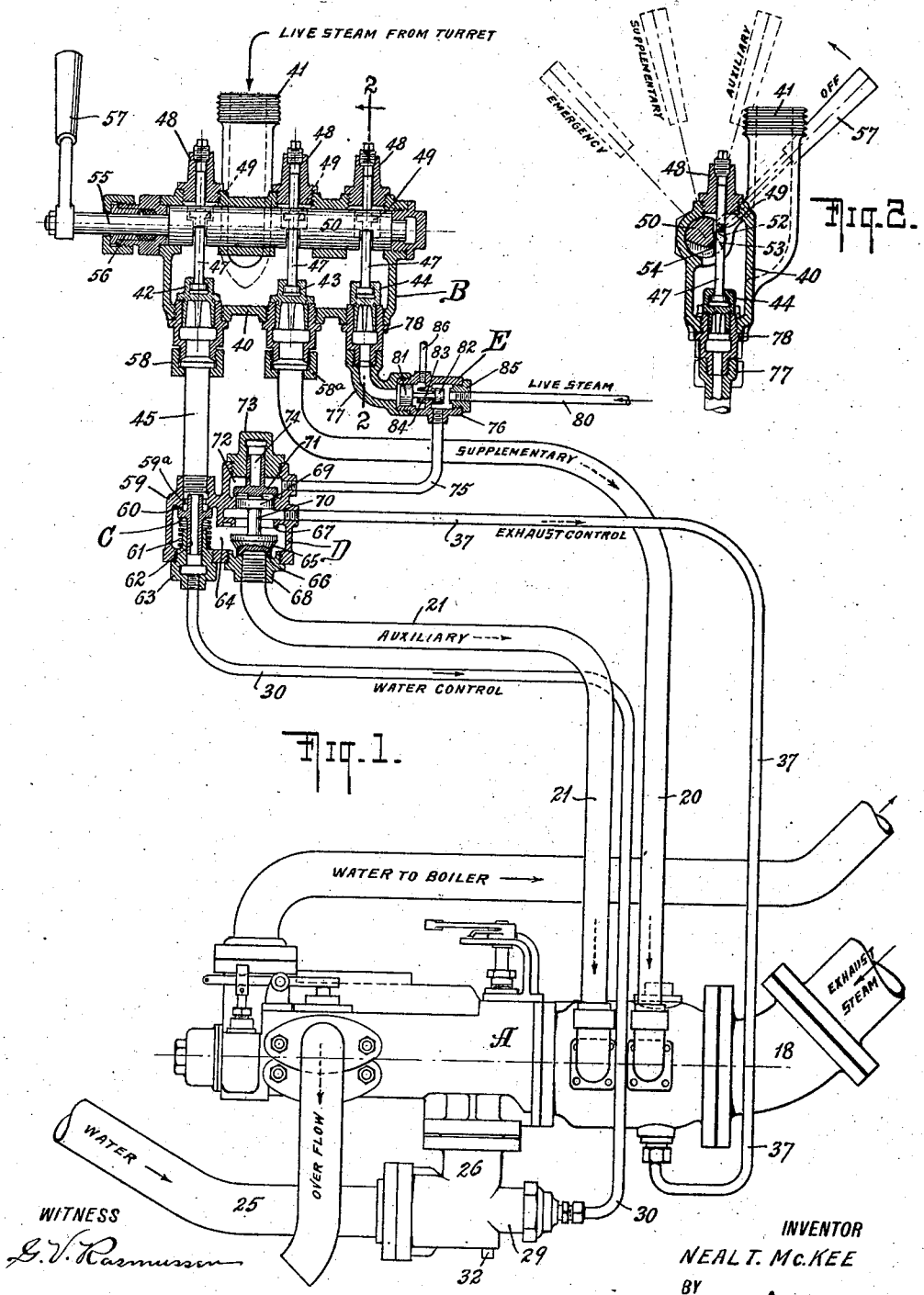

N. T. McKEE 1,618,135

EXHAUST STEAM INJECTOR

Filed Feb. 1, 1926

3 Sheets-Sheet 2

WITNESS
G. V. Rasmussen

INVENTOR
NEAL T. MC.KEE

BY
Bresen Nchrens
ATTORNEYS

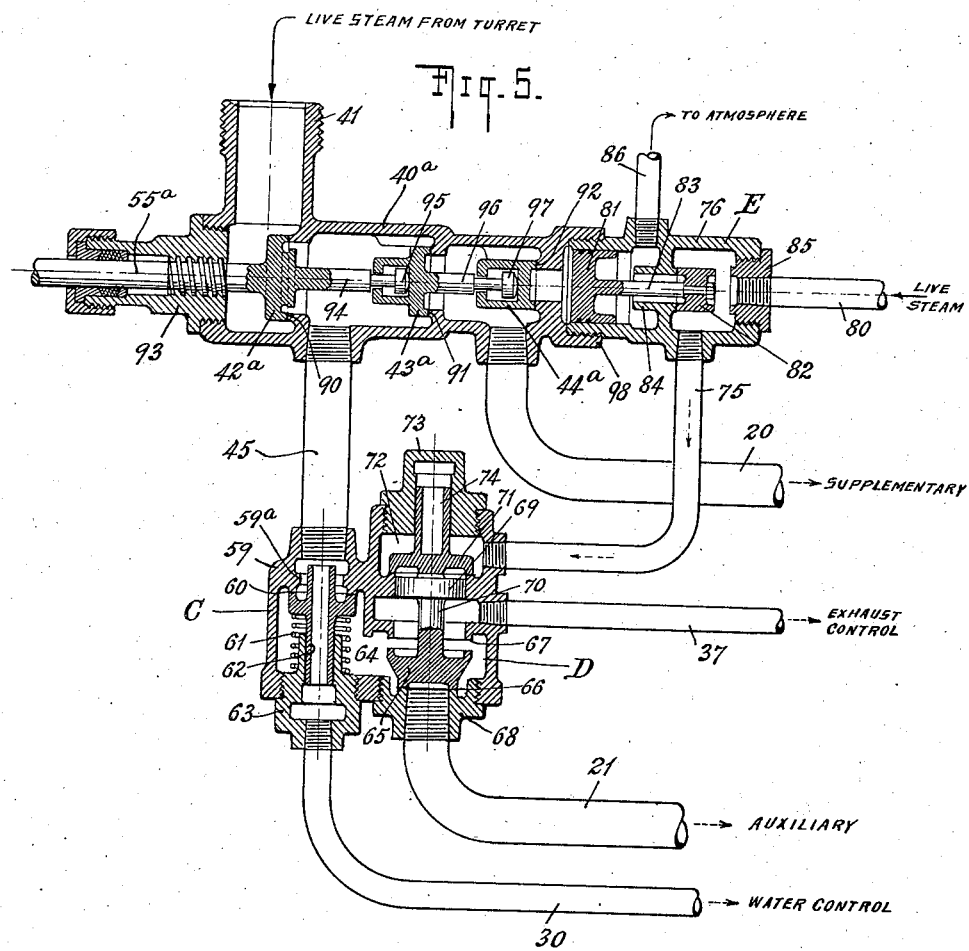

Patented Feb. 15, 1927.

1,618,135

UNITED STATES PATENT OFFICE.

NEAL T. McKEE, OF MOUNT VERNON, NEW YORK, ASSIGNOR TO THE SUPERHEATER COMPANY, OF NEW YORK, N. Y., A CORPORATION OF NEW YORK.

EXHAUST-STEAM INJECTOR.

Application filed February 1, 1926. Serial No. 85,133.

This invention relates to steam injectors of the type primarily intended for operation by exhaust steam from an engine, supplemented when necessary by a supply of live steam. The principal object of this invention is to improve upon and simplify the construction of controlling devices or systems for governing the admission of the live and exhaust steam as well as the water to the injector.

Considered more specifically, one of the objects of the present invention is to improve upon and simplify the construction of the injector control system shown in the United States Patent 1,531,004, granted to Malcolm Hard and William A. Buckbee, March 24, 1925, by providing a direct control for the valves of the live steam conduits leading to the injector instead of an indirect control as shown in said patent. Another object is to combine with a plurality of valve controlled conduits, a single manually operable handle and mechanical connections therefrom for directly actuating the valves of said conduits in a predetermined order or succession.

A further object is to increase the efficiency of the injector by first admitting exhaust steam to the injector for beginning the establishment of the jet instead of using live steam; the temperature of the injector being maintained at a lower degree because of the lower temperature of the exhaust steam, a greater condensation of the steam occurs and consequently a higher vacuum and greater velocity of flow is secured.

Figure 3:
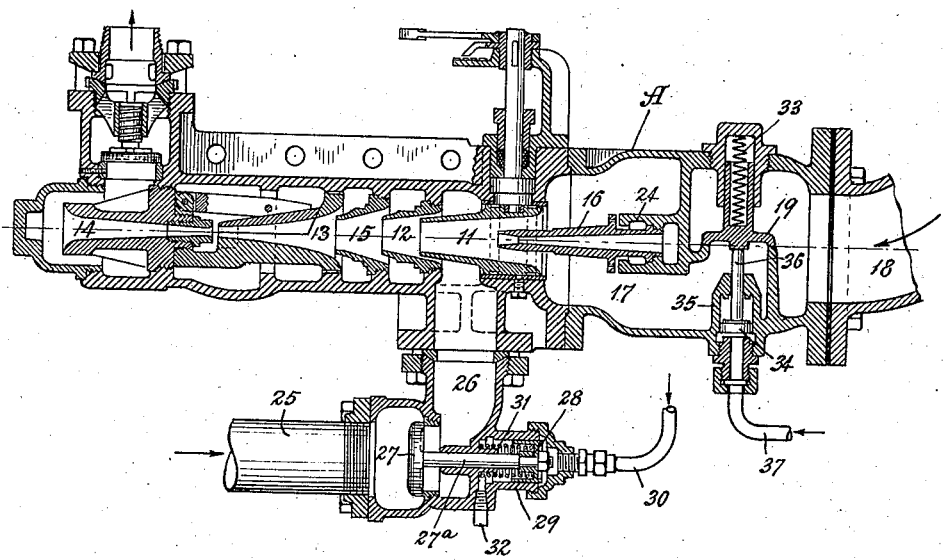
Figure 4:
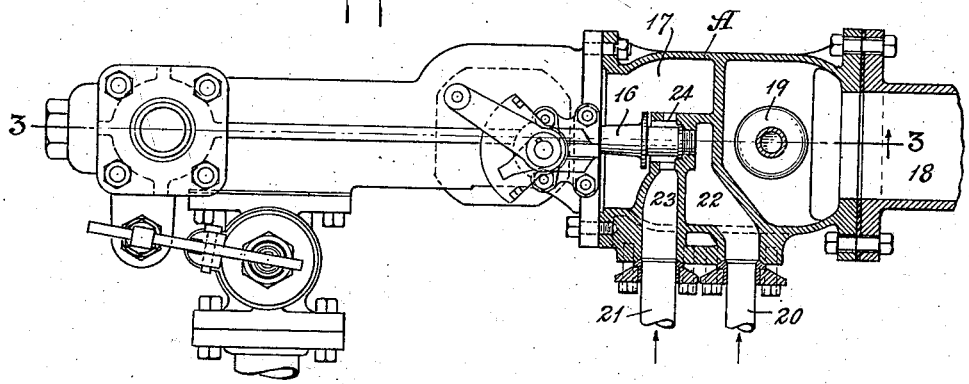

These and other objects such as simplicity, and therefore, low cost of construction, installation and maintenance will appear more fully from the following more detailed description and by reference to the accompanying drawings forming a part hereof and wherein Fig. 1 is a side elevation of an injector installation embodying my invention to a locomotive, the upper controlling valves being shown in section; Fig. 2 is a section on the line 2—2 of Fig. 1; Fig. 3 is a central vertical section through the injector proper taken on the line 3—3 of Fig. 4; Fig. 4 is a plan view, partly in section, of the injector, and Fig. 5 is an enlarged sectional view of a different constructional example, the parts shown in this view corresponding to the upper parts shown in section in Fig. 1.

Two constructional examples are shown in the drawings, the preferred form of Figs. 1 and 2 having a plurality of poppet valves actuated by a cam shaft to which the main control handle is attached to open the supply pipes for the auxiliary and supplementary live steam. An automatic valve and a retarding valve are interposed in the auxiliary live steam line; the retarding valve allowing live steam to pass to the water valve operating means to open the water supply, after which, due to the building up of pressure on the retarding valve, said valve opens to admit the steam to the automatic valve. An intercepting valve is interposed in the line from the automatic valve to the steam chest or main steam line of the engine and is operated by steam from the main valve casing which is admitted to the intercepting valve by the opening of the emergency valve, one of the poppet valves above referred to. The entire system of valves is arranged to admit the water, exhaust steam and supplementary live steam to the injector successively in the order named. Under certain conditions when it is desired to operate the injector as a live steam injector independently of the automatic valve, the main control handle is thrown to its full open position to open the emergency valve which admits the steam to the above mentioned intercepting valve.

In the second form shown in Fig. 5, the main valve, supplementary valve and emergency valve are connected in tandem with lost motion in the connections to insure the successive openings of the valves of the main valve casing in the order above set forth.

For convenience in description, the parts will be described under the following headings:

The injector A.
The main control B.
The retarding valve C.
The automatic valve D.
The intercepting valve E.

*The injector A (Fig. 3).*

For the purpose of illustration I have shown my invention applied to an exhaust steam injector A of the type disclosed in the United States Patent No. 1,342,128, granted June 1, 1920, to J. Metcalf et al. This type of injector, as shown more clearly in Fig. 3, comprises an outer casing in which there is contained a main exhaust steam nozzle 11, a water cone or preliminary mixing nozzle 12 into which the water issues with steam from the main exhaust steam nozzle; a combining nozzle 13, a delivery nozzle 14; a further preliminary mixing nozzle 15 between the water cone 12 and the combining nozzle 13; and a supplementary live steam nozzle 16. Exhaust steam from the engine is led to the exhaust steam chamber 17 of the injector by the conduit 18; a valve 19 being provided at the inlet of the exhaust steam chamber 17 for controlling the admission of exhaust steam from the pipe 18 to the injector. Live steam is supplied to the injector through the supplementary live steam conduit 20 (see Fig. 4) and the auxiliary live steam conduit 21, suitably connected to the injector by means to be hereinafter described, the supplementary live steam passing through a conduit 22 formed in the injector casing to the supplementary live steam nozzle 16 and the auxiliary live steam passing through a conduit 23 to an annular discharge opening or nozzle 24 by which it is directed into the exhaust steam chamber 17 to flow therefrom to the main exhaust steam nozzle 11. A conduit 25 leading from the water tank is connected with a small casing 26 provided with a water valve 27 which valve controls the flow of water from the pipe 25 through the casing 26 to the water cone 12 of the injector.

The admission of exhaust steam through the conduit 18, of water through the conduit 25 and of live steam through the conduits 20 and 21, is under the control of a single manually operable main controlling device and other instrumentalities presently to be described.

The water valve 27 is adapted to be normally held to its seat by the pressure of the water within the pipe 25 and to be opened against said pressure by a fluid pressure responsive device, which may be of any suitable construction, but which is shown as a piston 28 suitably secured to the stem 27ª of the valve 27 and mounted within a cylinder 29 formed in the casing 26. A small pipe 30 leads from the cylinder 29 to the retarding valve C. A coil spring 31 is provided to assist in holding the valve 27 normally to its seat and a bleed pipe 32 leads from the cylinder 29 for permitting the escape of any water of condensation which might otherwise collect within the cylinder 29 and interfere with the opening of the valve.

The exhaust steam valve 19 is normally held to its seat by a small spring 33 and a fluid pressure responsive device of any suitable construction is provided for opening said valve. As shown, this device consists of a small piston 34 mounted in a cylinder 35 formed in the casing of the injector A, the piston 34 being provided with a piston rod or stem 36 which projects upwardly and is adapted to contact with the valve 19 and raise it off its seat when steam or other fluid under pressure is admitted to the cylinder 35 through the pipe 37. The pipe 37 leads from the cylinder 35 to the casing of the automatic valve D and steam is admitted to said pipe in a manner which will hereinafter be described.

*The main control B (Figs. 1 and 2).*

The main control comprises a valve casing 40 having a screw-threaded inlet 41 to which is adapted to be connected a pipe leading preferably to the live steam turret of the locomotive for leading live steam under pressure into the interior of said casing. Mounted within the casing 40 is a plurality of poppet valves which for convenience will be designated as the main valve 42, the supplementary valve 43 and the emergency valve 44 which control, respectively, the admission of steam to the pipe 45 leading to the retarding valve C, the conduit 20 for the supplementary live steam and the outlet to which is connected the intercepting valve E. Each of the poppet valves 42, 43 and 44 has swivelly connected thereto the lower end of a valve stem 47, the upper end of which stem is slidably mounted in a central bore of a bonnet 48; the bonnet being detachably mounted in the valve casing to enable the valves to be readily withdrawn from the casing and replaced or rebound whenever necessary. Each of the valve stems 47 is further provided with a pair of laterally projecting lugs 49 adapted to be engaged by a cooperating cam surface formed on the cam shaft 50. Three cam surfaces 52, 53 and 54 are provided, the cam surface 52 serving to actuate the main valve 42, the cam surface 53 serving to actuate the supplementary valve 43 and the cam surface 54 serving to actuate the emergency valve 44. The cam shaft 50 is rotatably mounted in suitable bearings and has one end reduced as at 55. This reduced end projects through a stuffing box 56 and has secured to its outer extremity a main control handle 57. Suitable couplings 58 and 58ᵃ are provided for connecting the pipes 45 and 20 to the valve casing 40.

The retarding valve C.

The pipe 45 to which steam is admitted from the valve casing 40 by the opening of the main valve 42, is connected to a valve casing which, in the example illustrated, contains the retarding valve C and the automatic valve D. The seat 60 of the retarding valve is normally held by the coil spring 61 in contact with a cooperating seat formed upon the valve casing 59. The valve seat 60 projects laterally from a hollow tubular sleeve 62 slidably mounted in a tubular closure 63 to which closure is attached one end of the pipe 30 leading to the fluid pressure means for the water control valve. When the main valve 42 is opened, the steam which passes through the pipe 45 will first flow through the bore of the tubular sleeve 62 and, passing through pipe 30 to cylinder 29 and piston 28, will open the water valve 27. As the pressure builds up within the pipe 30 to a predetermined point, as for example, 50 pounds per square inch, the pressure of the spring 61 will be overcome and the retarding valve C will be opened, thereby permitting the steam from the pipe 45 to flow, through the passageway 64, provided in the valve casing 59, to the automatic valve D. It will be noted that the casing 59 is provided adjacent to the upper end of the tubular sleeve 62 with a projecting annular rib 59ᵃ which defines with said sleeve a restricted passageway to throttle the live steam flowing to the automatic valve and thereby reduce the pressure of such live steam to approximately the same pressure as the exhaust steam.

The automatic valve D (Fig. 1).

The automatic valve D comprises a valve member 65 mounted between a pair of valve seats 66 and 67, the valve seat 67 being formed on the valve casing 59 and the valve seat 66 being formed on a detachable closure 68 to which is secured one end of the conduit 21 leading to the auxiliary live steam nozzle of the injector. Formed upon the valve member 65 is a piston 69 slidably mounted within a cylindrical bore of the valve casing 59; said piston 69 being spaced from and secured to the valve member 65 by a short connecting stem 70. Steam which passes to the automatic valve D will flow therefrom into the auxiliary live steam conduit 21 or into the pipe 37 leading to the fluid pressure means for the exhaust steam valve, according to whether the valve 65 is in contact with its upper seat 67 or its lower seat 66. The position of the valve 65 is controlled by a fluid pressure responsive member 71 mounted immediately above the piston 69 within a compartment 72 formed by the valve casing 59 and a detachable cap 73; the cap 73 having a central bore in which an upwardly extending cylindrical projection 74 of the fluid pressure member 70, 71 is slidably mounted. Communicating with the compartment 72 is a pipe 75 to which live steam is admitted from the steam chest of the locomotive. The piston 69 is a loose fit in its bore of the casing 59, so that the steam, which passes through the passageway 64 to the automatic valve, in addition to creating a downward pressure on the valve 65 also finds its way around piston 69 to the top surface of said piston and exerts a downward pressure thereon which assists in holding the valve 65 on its lower seat. Assuming that live steam under pressure is present in the pipe 75, the valve 71 will be held to its seat, because the pressure of the steam within the small chamber formed between the upper surface of the piston and the valve 71 is lower, because of the choke 59ᵃ previously described, than the steam pressure in pipe 75. When the parts are in this position the valve 71, as shown in Fig. 1 does not contact with the piston 69. When the pressure in the pipe 75 is released, the steam pressure below the valve 71 raises said valve off its seat and permits the escape into the compartment 72 of the steam which leaks past the piston. As the leakage around the piston 69 is not great enough to permit the pressure to build up in the compartment 72 above the piston 69 in time to hold the piston down, the entire piston and valve combination will move upwardly until the valve 65 is on its upper seat 67 in which position it will be held by the pressure of the steam passing into the automatic valve through the passage 64.

The intercepting valve E.

The pipe 75, one end of which communicates with the compartment 72, has its other end connected with the casing 76 of the intercepting valve E, said valve casing 76 being connected by an L fitting 77 with a coupling 78 secured to the casing 40 of the main control valve. Live steam from the main control valve casing 40 is admitted to the casing 76 of the intercepting valve whenever the emergency valve 44 is raised from its seat by the operation of the cam shaft 50 and main control handle 57. Suitably connected to the intercepting valve casing is a small pipe 80 which leads to the main steam line or the steam chest of the locomotive. Slidably mounted within the intercepting valve casing 76 is a combined piston 81 and valve member 82 connected by a small stem 83 which passes through a central bore formed in a web 84 provided in the interior of the valve casing 76; the stem 83, as clearly shown in Fig. 1 of the drawing, being of smaller diameter than said bore to provide a clearance space for a purpose presently to be described. Assuming the throttle of the engine to be open and steam under pressure to be present in the main steam line or steam chest of the engine, the steam will flow through the pipe 80 into the valve casing 76 and, if the emergency valve 44 is closed, such steam will cause the valve 82 to be moved to the left in Fig. 1 and into contact with a valve seat formed on the right-hand face of the web 84; the steam passing through the valve casing 76 to the pipe 75 and thence to the compartment 72 to hold the fluid pressure responsive member 71 in its lower position as shown in Fig. 1. If, however, the emergency valve 44 is opened, the pressure of the live steam issuing from the main control casing 40 will move the piston 81 toward the right (in Fig. 1) and cause the valve member 82 to contact with a valve seat formed upon the cap or closure 85 at the right-hand side of the valve casing 76, thus closing the pipe 80 and preventing the steam pressure within said pipe from acting upon the fluid pressure responsive member 71. When this occurs, the steam within the pipe 75 and the compartment 72 is vented to the atmosphere through the small pipe 86 connected to the valve casing 76; the steam passing through the clearance space between the valve stem 83 and the central bore of the web 84.

*Operation.*

The operation of the device shown in Figs. 1–4, inclusive, is as follows:

When the main control handle 57 is in the off position shown in full lines in Fig. 2, all of the various valve members will be in the closed positions shown in the drawing. When it is desired to start the injector, the main control handle 57 is rotated in the direction of the arrow shown in Fig. 2, to the position designated "Auxiliary". In this latter position, the cam surface 52 has engaged the laterally projecting lugs 49 of the valve stem 47 for the main valve 42 and has lifted said valve off its seat. This permits the live steam from the valve casing 40 to flow through the pipe 45, such steam first flowing through the tubular sleeve 62 of the retarding valve C and thence through the pipe 30 to the fluid pressure means for the water valve 27 to open the water valve and permit the water from the conduit 25 to flow into the injector. As the steam which flows into the cylinder 29 of the fluid pressure member of the water valve is trapped, the steam pressure builds up rapidly in the pipes 30 and 45 and when it reaches a predetermined pressure, as for example, 50 pounds per square inch, the retarding valve is opened and the steam passes through the passage 64 to the automatic valve D. If at this time the throttle of the engine is opened and live steam under pressure is present in the main steam line of the engine or the steam chest, the pressure of such steam is communicated through the pipe 80, the intercepting valve casing 76 and the pipe 75 to the compartment 72 and will hold the fluid pressure responsive member 71 in its lower position as shown in Fig. 1 of the drawing. The trapping of the steam, which leaks past the piston 69, between the upper surface of the piston and the lower surface of the valve member 71, the downward pressure of this steam upon the piston, and also the downward pressure of the steam in the automatic valve casing upon the valve 65, will hold the valve 65 in its lower position, thus permitting the steam which passes from the pipe 45 to the automatic valve casing to flow around the valve stem 70 and upwardly into the pipe 37. This steam flowing into the pipe 37 actuates the piston 34 for the exhaust steam valve 19, forcing said piston upwardly and raising the exhaust steam valve 19 off its seat, thus permitting exhaust steam from the conduit 18 to flow into the injector.

Under certain conditions, the pressure of the exhaust steam may be sufficient to establish the jet, but, however, if the steam pressure of the exhaust steam is not sufficient to establish and maintain the jet, the control handle 57 is thrown to the position designated "Supplementary" in Fig. 2. In this position of the main control handle, the cam surface 53 causes the supplementary valve 43 to be opened, thus permitting a portion of the live steam from the casing 40 to flow through the conduits 20 and 22 to the supplementary live steam nozzle 16 of the injector; the live steam issuing from the nozzle 16 mingling with the exhaust steam and raising the delivery pressure of the injector to an amount sufficient to overcome the boiler pressure. If the throttle of the engine is not open and therefore no live steam is delivered by the pipes 80 and 75 to the compartment 72 of the automatic valve, the pressure of the steam from the pipe 45 and main control casing 40 passing into the automatic valve casing through the passage 64 will raise the valve member 65 out of contact with its lower seat 66 and into contact with its upper seat 67, as hereinbefore described, thus shutting off the flow of live steam through the pipe 37 to the fluid pressure means for the exhaust steam valve 19 and permitting the live steam which flows into the automatic valve casing to flow through the auxiliary live steam conduit 21 and through the auxiliary live steam nozzle 24 to the exhaust steam chamber 17 of the injector; the live steam entering the chamber 17 flowing into the main exhaust steam nozzle 11 and the injector now operating entirely upon live steam.

Certain conditions exist from time to time in the operation of a steam locomotive in which there may be no exhaust steam available, or exhaust steam of very low pressure even when the throttle of the engine is opened. If it is necessary to operate the injector at such times, the control handle 57 is thrown to the position designated "Emergency" in Fig. 2 of the drawing. In this position, the cam surface 54 will raise the emergency valve 44 off its seat, the main valve 42 and supplementary valve 43 still being maintained open by the cam surfaces 52 and 53. The opening of the emergency valve 44, as heretofore explained, permits the live steam from the main control casing 40 to flow through the L 77 and force the combined piston 81 and valve 82 to the right (Fig. 1), thus cutting off the supply of live steam from the pipe 80 to the pipe 75. With the parts in this position, as there will be no pressure upon the fluid pressure responsive member 71, the valve 65 will be moved to its upper position, thus permitting live steam to flow through the auxiliary live steam conduit and the injector will be operated by a supply of steam through the supplementary live steam conduit 20 and the auxiliary live steam conduit 21.

In the modification shown in Fig. 5, I have substituted a plurality of valves connected in tandem for the poppet valves of Fig. 1. As shown, the valve casing 40$^a$ is provided with a plurality of seats 90, 91 and 92 with which the main valve 42$^a$, the supplementary valve 43$^a$ and the emergency valve 44$^a$ respectively are adapted to cooperate. The main valve 42$^a$ is provided with a screw-threaded stem 55$^a$ mounted within a screw-threaded detachable cap or closure 93; it being understood that the outer projecting end of the valve stem 55$^a$ has secured thereto a control handle 57 similar to that shown in Fig. 1 of the drawing. Projecting from the inner face of the main valve 42$^a$ and preferably integrally therewith is a connecting rod 94 having its extremity swivelly connected by a lost motion connection 95 with the supplementary valve 43$^a$. This valve, in turn, is connected by a similar rod 96 and connection 97 with the emergency valve 44$^a$. In the constructional example shown in Fig. 5, the casing 76 of the emergency valve E is directly connected to the screwthreaded boss 98 of the valve casing 40$^a$. The pipe 45 leading to the retarding valve C and the conduit 20, for the supplementary live steam are secured respectively to suitable screwthreaded apertures located between the valve seats 90 and 91 and the valve seats 91 and 92 respectively. The construction and operation of the retarding valve C, the automatic valve B and the intercepting valve E and the connections from these valves are identical with those described above in connection with the constructional example shown in Fig. 1 of the drawing. The operation of the plurality of valves shown in Fig. 5 will be readily understood, the main valve 42$^a$ being opened first by the rotation of the main control handle and the steam flowing first to the pipe 45 before the lost motion connection 95 permits the supplementary valve 43$^a$ to be opened. Further rotation of the control handle and valve stem 55$^a$ will open the supplementary valve 43$^a$, permitting the steam to flow to the supplementary live steam conduit 20; the lost motion connection 97 preventing the opening of the emergency valve 44$^a$ until the control handle is opened to its full opened position.

It will be understood that many changes, variations and modifications of the constructional examples herein disclosed may be resorted to without departing from the spirit of my invention.

I claim:

1. The combination with an exhaust steam injector having a plurality of conduits for supplying exhaust steam, live steam and water to said injector, of a manually operable controlling device and a plurality of valves governed thereby to cause the water, the exhaust steam and the live steam to be admitted to the injector successively in the order set forth.

2. The combination with an exhaust steam injector having a valve controlled conduit connected thereto for the admission of water, and a valve controlled conduit for the admission of steam, to said injector, of fluid pressure operated means to actuate the valves of said conduits, a main control to admit fluid under pressure to said means and a retarding device to prevent opening of the valve for said steam conduit before the valve of said water conduit is opened.

3. The combination with an exhaust steam injector having a valve controlled conduit connected thereto for the admission of water, and a valve controlled conduit for the admission of steam, to said injector, of fluid pressure operated means to actuate the valves of said conduits, a main control, a pipe leading from said main control, a pair of branches communicating with said pipe, one of said branches leading to the fluid pressure means for the valve of said water conduit and the other of said branches leading to the fluid pressure means for the valve of said steam conduit, and a retarding valve located between said pipe and pair of branches to prevent admission of fluid under pressure to the exhaust steam valve operating means before said water valve is opened.

4. The combination with a steam injector having a pair of conduits connected therewith for supplying respectively water and steam, to said injector, of a fluid pressure actuated valve for each of said conduits, a pipe connecting the fluid pressure actuated means for each of said valves with a source of fluid under pressure, and a retarding valve to prevent the passage of fluid to the means for actuating said steam valve, before said water valve is opened.

5. The combination with an exhaust steam injector having a plurality of conduits connected therewith for supplying respectively water, exhaust steam, supplementary and auxiliary live steam, to said injector, of a fluid pressure actuated valve for said water conduit, an automatic valve for controlling the admission of the auxiliary live steam and exhaust steam to said injector in alternation only, a main valve, a connection leading from said main valve to said automatic valve and to the fluid pressure actuated water valve and a retarding valve interposed between said main and automatic valves to prevent the passage of steam to said automatic valve until said water valve is opened.

6. The combination with a steam injector having a pair of conduits connected therewith for supplying respectively water and steam to said injector, of a fluid pressure actuated valve for each of said conduits, a pipe connecting the fluid pressure actuated means for each of said valves with a source of fluid under pressure, and a retarding valve to prevent the passage of fluid to the means for actuating said steam valve, before said water valve is opened, said retarding valve comprising a tubular sleeve having a valve seat connected thereto and a spring to hold said retarding valve closed until the pressure of said fluid upon said valve seat reaches a predetermined point.

7. The combination with an injector, having connected therewith a plurality of conduits for supplying respectively water, exhaust steam, supplementary and auxiliary live steam to said injector, of fluid pressure operated means for actuating the valves for said water and exhaust steam conduits, an automatic valve for admitting live steam alternately to said auxiliary conduit and to the fluid pressure means for the exhaust steam valve and a main control having a plurality of valves mounted therein to admit fluid under pressure to said automatic valve and directly to said supplementary live steam conduit.

8. The combination with an exhaust steam injector having connected therewith a plurality of conduits for supplying respectively water, exhaust steam, supplementary live steam and auxiliary live steam to said injector, of a main control, fluid pressure operated valves for said water, exhaust steam and auxiliary live steam conduits, said main control comprising a main valve by which the admission of fluid under pressure to said fluid pressure operated valves is controlled, a valve for admitting live steam directly to said supplementary live steam conduit, and mechanical actuating means associated with and common to said last-named valve and said main valve.

9. The combination with an exhaust steam injector having connected therewith a plurality of conduits for admitting respectively supplementary and auxiliary live steam and exhaust steam to said injector, of an automatic valve for permitting the admission of auxiliary live steam and exhaust steam to said injector in alternation only, said automatic valve including a fluid pressure responsive member, a connection leading from the automatic valve to a steam line of an engine the pressure with in which is normally indicative of the steam pressure of the exhaust steam supplied to the injector, and an intercepting valve interposed in said connection for shutting off the fluid pressure therein from said fluid pressure responsive member.

10. The combination with an exhaust steam injector having connected therewith a plurality of valve controlled conduits for supplying respectively water, exhaust steam, supplementary live steam and auxiliary live steam to said injector, of a main control comprising a valve casing, a main valve, a supplementary live steam valve and an emergency valve mounted therein, a single manually operable control handle and mechanical connections associated therewith for operating said valves directly by the actuation of said handle.

11. The combination with an exhaust steam injector having a plurality of valve controlled conduits connected therewith for supplying respectively water, exhaust steam, supplementary live steam, and auxiliary live steam to said injector, of a main control valve casing, fluid pressure actuated valves for said water conduit and said exhaust steam conduit, connections leading from said casing to the fluid pressure means for said valves, a valve interposed between said casing and the exhaust valve and operated automatically by fluid under pressure from the main steam line of the engine for normally controlling automatically the admission of steam to said injector in alternation through said exhaust steam conduit and through said auxiliary live steam conduit, and a retarding valve interposed between said casing and automatic valve to prevent the flow of steam to the automatic valve before said water valve is opened.

12. The combination with an exhaust steam injector having a plurality of conduits connected therewith for supplying respectively water, exhaust steam, supplementary and auxiliary live steam to said injector, of a fluid pressure actuated valve for said water conduit, an automatic valve for controlling the admission of the auxiliary live steam and exhaust steam to said injector in alternation only, a main valve, a connection leading from said main valve to said automatic valve and to the fluid pressure actuated water valve, and a retarding valve interposed between said main and automatic valves to prevent the passage of steam to said automatic valve until said water valve is opened, said retarding valve being provided with a restricted passageway to reduce the pressure of the live steam flowing to said automatic valve.

13. The combination with an exhaust steam injector, of a main control valve casing connected to a source of live steam under pressure, a pair of conduits leading from said casing to said injector, one of said conduits supplying auxiliary, and the other, supplementary, live steam to said injector, a cam shaft mounted within said casing, a pair of valves for controlling the admission of steam to said conduits and a single manually operable handle for actuating said cam shaft and valves.

14. The combination with an exhaust steam injector having connected therewith a plurality of conduits for admitting respectively supplementary and auxiliary live steam and exhaust steam to said injector, of an automatic valve for permitting the admission of auxiliary live steam and exhaust steam to said injector in alternation only, said automatic valve including a fluid pressure responsive member, a connection leading from the automatic valve to a steam line of an engine the pressure within which is normally indicative of the steam pressure of the exhaust steam supplied to the injector, an intercepting valve interposed in said connection for shutting off the fluid pressure therein from said fluid pressure responsive member and a main control including a plurality of valves for governing the admission of steam to said automatic valve, to said supplementary live steam conduit and to said intercepting valve.

15. A control system for an exhaust steam injector in which is provided a main control for controlling the admission of fluid under pressure to actuate the valves for the admission respectively of water, live steam and exhaust steam to said injector, and an automatic valve controlled by the steam pressure in the main steam line of an engine to permit the admission of live steam and exhaust steam to said injector normally in alternation only, characterized by the provision of an emergency valve for shutting off the steam pressure to the automatic valve and thereby cause said injector to be operated as a live steam injector.

16. A control system for an exhaust steam injector in which is provided a main control for controlling the admission of fluid under pressure to actuate the valves for the admission respectively of water, live steam and exhaust steam to said injector, an automatic valve and a connection from the live steam line of an engine to said automatic valve, characterized by the provision of an intercepting valve to close said connection.

17. A control system for an exhaust steam injector in which is provided a main control for controlling the admission of fluid under pressure to actuate the valves for the admission respectively of water, live steam and exhaust steam to said injector, an automatic valve and a connection from the live steam line of an engine to said automatic valve, characterized by the provision of an intercepting valve interposed in said connection and an emergency valve operated by said main control to admit fluid under pressure to said intercepting valve to cause it to close said connection.

18. A control system for an exhaust steam injector in which is provided a main control for controlling the admission of water, supplementary and auxiliary live steam and exhaust steam to said injector, an automatic valve to control the admission of auxiliary live steam and exhaust steam to said injector in alternation, and a connection from said automatic valve to the main steam line of an engine normally to admit steam to said automatic valve and prevent it from permitting the admission of auxiliary live steam when exhaust steam is being admitted to said injector, characterized by the provision of a fluid pressure operated intercepting valve in said connection, a main valve to admit auxiliary live steam to said automatic valve, a supplementary live steam valve and an emergency valve to admit steam to said intercepting valve.

19. A control system as set forth in claim 18, in which said main valve, said supplementary live steam valve and said emergency valve are actuated by a single manually operable control handle.

20. A control system as set forth in claim 18, in which a retarding valve is interposed between said main valve and automatic valve to prevent the passage of the auxiliary live steam to said automatic valve before the water is admitted to said injector.

21. A control system as set forth in claim 18, in which a fluid pressure operated means is provided for actuating the valve for the admission of water to said injector, and a pipe leading to said means is under the control of said main valve.

22. A control system as set forth in claim 18, in which a fluid pressure operated means is provided for actuating the valve for the admission of water to said injector, a pipe connects said main valve, automatic valve and said means, and a retarding valve is interposed between said main and automatic valves to prevent the admission of fluid to said automatic valve before said water valve is opened.

23. The combination with an exhaust steam injector, of a main control comprising a casing connected to a supply of live steam, an auxiliary live steam conduit and a supplementary live steam conduit connecting said casing and injector, an automatic valve in said auxiliary live steam conduit, a retarding valve between said automatic valve and said casing, a pair of valves in said casing to control the admission of live steam to said auxiliary and live steam conduits, and a single manually operable control handle for actuating said pair of valves.

24. The combination with an exhaust steam injector having valve controlled conduits connected therewith for the admission of water and exhaust steam to said injector, of fluid pressure means for actuating said valves, a main valve casing connected with a supply of live steam, an auxiliary live steam conduit and a supplementary live steam conduit connecting said casing and injector, an automatic valve in said auxiliary live steam conduit between said casing and injector, a retarding valve between said automatic valve and casing, fluid pressure operated means for the water and exhaust steam valve, a pipe connecting said retarding valve and the fluid pressure means for said water valve, and a second pipe connecting said automatic valve and the fluid pressure means for the exhaust steam valve.

25. The combination with an exhaust steam injector having valve controlled conduits connected therewith for the admission of water and exhaust steam to said injector, of fluid pressure means for actuating said valves, a main valve casing connected with a supply of live steam, an auxiliary live steam conduit and a supplementary live steam conduit connecting said casing and injector, an automatic valve in said auxiliary live steam conduit between said casing and injector, a retarding valve between said automatic valve and casing, fluid pressure operated means for the water and exhaust steam valve, a pipe connecting said retarding valve and the fluid pressure means for said water valve, a pair of pipes connected to said automatic valve, one leading to the fluid pressure means for said exhaust steam valve and the other to the main steam line of the engine, and an intercepting valve interposed in said other pipe and in communication with said casing.

26. The combination with an exhaust steam injector having valve controlled conduits connected therewith for the admission of water and exhaust steam to said injector, of fluid pressure means for actuating said valves, a main valve casing connected with a supply of live steam, an auxiliary live steam conduit and a supplementary live steam conduit connecting said casing and injector, an automatic valve in said auxiliary live steam conduit between said casing and injector, a retarding valve between said automatic valve and casing, fluid pressure operated means for the water and exhaust steam valve, a pipe connecting said retarding valve and the fluid pressure means for said water valve, a pair of pipes connected to said automatic valve, one leading to the fluid pressure means for said exhaust steam valve and the other to the main steam line of the engine, and an intercepting valve interposed in said other pipe and in communication with said casing, and a main valve, a supplementary live steam valve and an emergency valve mounted in said casing for controlling the admission of live steam respectively to said auxiliary live steam conduit, to said supplementary live steam conduit and to said intercepting valve.

27. A combination as set forth in claim 26, in which said casing has mounted therein a cam shaft having a plurality of cam surfaces for operating said main valve, said supplementary live steam valve and said emergency valve, and a manually operable control handle secured to said cam shaft.

28. The combination with an exhaust steam injector having conduits connected therewith for supplying live steam and exhaust steam to said injector, an automatic valve for controlling the admission of live and exhaust steam through said conduits to said injector, and a pipe line connecting said automatic valve with a source of fluid under pressure, of an intercepting valve casing interposed in said pipe line between said automatic valve and said source of fluid, said valve casing being provided with three ports, one of which communicates with the automatic valve, one with the source of fluid under pressure and one with the atmosphere, and a valve within said casing for alternately placing either of the two last mentioned ports in communication with the first named port.

29. The combination with an exhaust steam injector having conduits connected therewith for supplying live steam and exhaust steam to said injector, an automatic valve for controlling the admission of live and exhaust steam through said conduits to said injector, and a pipe line connecting said automatic valve with a source of fluid under pressure, of an intercepting valve interposed in said line between said automatic valve and said source of fluid under pressure, said valve comprising a casing having a vent leading to the atmosphere, and a valve member movable to either of two positions, in one of which said automatic valve is in communication with the atmosphere through said vent, and in the other of which said communication is shut off.

30. The combination with an injector primarily intended for operation by exhaust steam from an engine and having conduits connected therewith for supplying exhaust steam to said injector and live steam, an automatic valve for controlling the admission of steam through said conduits to said injector in accordance with the operating conditions of said engine, and a pipe line connecting said automatic valve with a steam line of the engine in which the pressure conditions are indicative of the pressure of the exhaust steam delivered to the injector, of an intercepting valve interposed in said pipe line having a vent leading to the atmosphere and a valve member for establishing communication between said vent and the automatic valve when it is desired to prevent the normal working operation of said automatic valve and to shut off said communication when said automatic valve is operating under normal conditions.

NEAL T. McKEE.